United States Patent [19]

Huber et al.

[11] Patent Number: 4,474,933

[45] Date of Patent: Oct. 2, 1984

[54] CROSSLINKING RESIN MIXTURES

[75] Inventors: Hans Huber, Troisdorf-Spich; Eduard Hänsel, Dusseldorf; Gerhard Geier, Lohmar, all of Fed. Rep. of Germany

[73] Assignee: Dynamit Nobel AG, Cologne, Fed. Rep. of Germany

[21] Appl. No.: 500,597

[22] Filed: Jun. 2, 1983

[30] Foreign Application Priority Data

Jun. 3, 1982 [DE] Fed. Rep. of Germany ....... 3220866

[51] Int. Cl.$^3$ ............................................ C08G 77/04
[52] U.S. Cl. .................................... 528/26; 428/149; 528/22; 528/25; 528/29; 528/30; 528/38; 556/450; 556/457; 556/458; 556/459; 525/457
[58] Field of Search ....................... 528/22, 25, 26, 29, 528/30, 38; 556/450, 457, 458, 459; 428/149; 525/457

[56] References Cited

U.S. PATENT DOCUMENTS

| | | | |
|---|---|---|---|
| 3,243,475 | 3/1966 | Reischl et al. | 528/28 |
| 3,372,083 | 3/1968 | Evans et al. | 428/149 |
| 3,453,243 | 7/1969 | Hartlein | 525/457 |
| 3,627,722 | 12/1971 | Seiter et al. | 528/28 |
| 3,632,557 | 1/1972 | Brode et al. | 528/28 |
| 3,886,226 | 5/1975 | Asai et al. | 528/28 |
| 3,979,344 | 9/1976 | Bryant et al. | 528/22 |
| 4,067,844 | 1/1978 | Barron et al. | 528/28 |
| 4,206,299 | 6/1980 | Yamazaki et al. | 528/28 |
| 4,222,925 | 9/1980 | Bryant et al. | 524/589 |

FOREIGN PATENT DOCUMENTS 5373772  6/1980  Japan ................................... 528/30

*Primary Examiner*—Melvyn I. Marquis
*Attorney, Agent, or Firm*—Felfe & Lynch

[57] ABSTRACT

The present invention relates to resin mixtures which are fluid at temperatures up to 100° C. and which crosslink either at elevated temperature or under the influence of moisture. Thermal crosslinking takes place at temperatures of 100° C. and up, preferably at about 120° C. The mixtures contain one or more mutually compatible polymers containing hydroxyl groups, in which at least 5% and not more than 90% of the hydroxyl groups are replaced by alkoxysilyl groups. The introduction of the alkoxysilyl groups is accomplished by the reaction of a diisocyanate with a hydroxyl group on the polymer, on the one hand, and with an aminosilane or mercaptosilane ester on the other. On the basis of their fluid-to-viscous consistency at room temperature or moderately elevated temperature, the resins can be applied in a thin coating and easily crosslinked in situ.

12 Claims, 3 Drawing Figures

FIG. 1. Effect of Temperature on Hardening Time

Effect of Hardener Concentration on Viscosity (130°C)

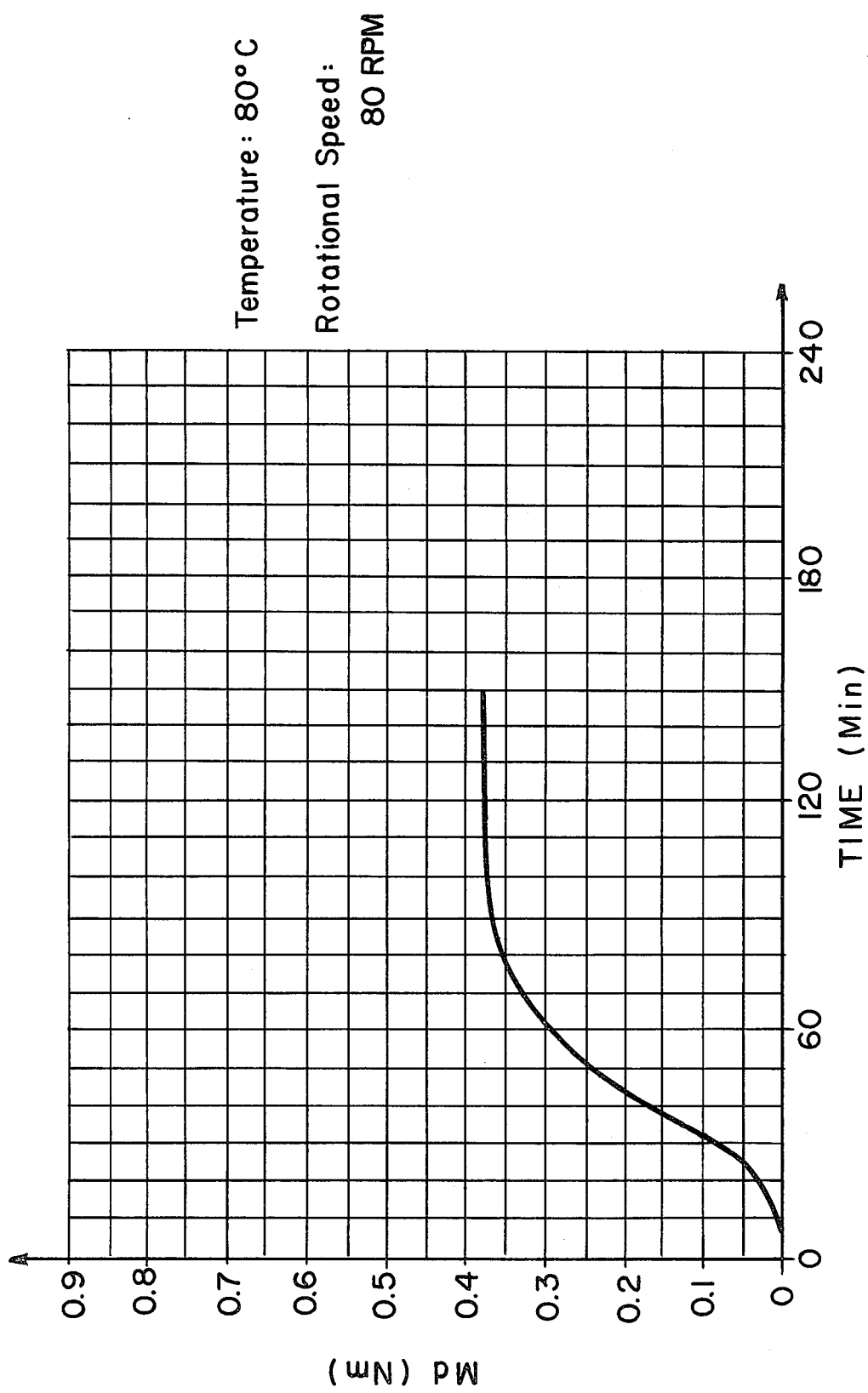

CROSSLINKING RESIN MIXTURES

BACKGROUND OF THE INVENTION

The subject of the present invention is crosslinking resin mixtures which are liquid at temperatures under 100° C. and are prepared on the basis of polymers containing hydroxyl groups and having a molecular weight of 500 to 20,000.

It is known that alkoxysilanes react readily with moisture. This tendency toward hydrolysis is useful in many ways, the adhesion-mediating action of the organosilanes between different kinds of materials being worthy of special note (see "Handbook of Adhesives", 2nd Edition, by Irving Skeist, pp. 640 sqq., Van Nostrand-Reinhold Co., 1977).

The hydrolysis of the alkoxysilanes with the formation of siloxane bonds has also been widely used for the crosslinking of polymers. In DE-OS No. 2,314,757 there is described a binding agent of which at least 50% by weight consists of a copolymer having lateral alkoxysilane groups. U.S. Pat. No. 4,291,136 describes a water-hardening, silane-modified alkylene-alkyl acrylate copolymer. Such copolymers, however, must be fabricated either from solution in organic solvents or with machines commonly used for plastic fabrication, such as extruding machines.

Attempts have already been made to produce liquid polymers containing no solvents, which can be crosslinked by the addition of water or by reaction with atmospheric moisture. In U.S. Pat. No. 3,632,557, the starting products are liquid polymers having terminal hydroxyl groups, which are transformed by reaction with excess diisocyanate to a polymer having terminal isocyanate groups. These are then reacted with an aminosilane, preferably gamma-aminopropyltrimethoxysilane, so that finally a liquid polymer results which is provided stoichiometrically, i.e., quantitatively, with alkoxysilyl terminal groups. Such liquid polymers set with atmospheric moisture to form rubber-like products which, however, suffer from a number of undesirable properties, as described very extensively in U.S. Pat. No. 3,971,751. Their poor elongation at rupture, and above all their extremely poor resistance to continued tearing, are serious disadvantages, and is found to a more or less great extent in all such materials which are terminated stoichiometrically with alkoxysilyl groups. This is equally true of the products described in U.S. Pat. Nos. 3,979,344 and 4,222,925. This disadvantage is largely overcome by the procedure described in U.S. Pat. No. 2,971,751; the process therein described, however, is so complex that the results described can be obtained better, and especially much more simply, by other methods.

The reactivity of alkoxysilanes with the hydroxyl groups of polymers containing hydroxyl rather than with water is utilized in the method that is the basis of Japanese Pat. No. 56084751: liquid polymers with terminal hydroxyl groups are hardened with alkoxysilanes at elevated temperature (150° C.) and elevated pressure (150 bar) to form elastomeric moldings. This process can be performed only with the application of pressure because, at the temperatures at which the transesterification is performed, the alkoxysilanes otherwise would volatilize and thus would be unable to act. For applications in which the material is in a thin layer, as for example in any kind of coatings, varnishes, glues, etc., this technology is entirely inapplicable.

BRIEF DESCRIPTION OF THE INVENTION

The present invention is addressed to the problem of preparing mixtures which can be processed in the liquid state at room temperature or at moderately elevated temperature (i.e., under 100° C.), applied as a coating, and then can be transformed by crosslinking to a state of substantially higher consistency. The use of organic solvents should be restricted to a minimum or, better, entirely eliminated.

It has now been found that this problem can be solved by using fluid polymers containing hydroxyl groups and replacing the hydroxyl groups, not entirely but only partially, i.e., in a less-than-stoichiometric ratio, with alkoxysilyl terminal groups, the alkoxysilanes being linked to the polymer, however, by chemical bonding. The mixture thus formed, which accordingly contains both hydroxyl groups and alkoxysilyl terminal groups, can be set not only by moisture but also by the action of heat, while not only the setting conditions but also the properties of the end product can be varied widely by the appropriate selection of the starting products. All that the products have in common is that the degree of crosslinking of the end product can be determined as desired through the silane content, without the occurrence of incompatibility phenomena between crosslinking and non-reacting polymer molecules.

The invention can be performed in a great variety of ways. Fundamentally, a polymer which contains hydroxyl groups and is in the liquid state at room temperature or moderately elevated temperature (less than 100° C.) serves as the starting material. Especially suitable are polyester polyols, polyether polyols, polyether ester polyols, functional glycerides and partial glycerides (e.g., castor oil or ricinus monodiglyceride), or hydroxyl groups containing polybutadienes and poly(methy)acrylic acid ester copolymers.

Accordingly, the molecular weight of the starting products is less than 20,000, and in most cases less than 10,000.

Only in the case of poly(meth)acrylic acid ester copolymers can products with a molecular weight up to 30,000 be used.

The introduction of the alkoxysilanes into the polymer molecules can be performed in various ways. One advantageous method consists in the reaction of the named polymers with diisocyanates and those organofunctional silanes which are capable of reaction with isocyanates, one NCO group reacting with the silane and one with an OH group of the polymer. Suitable for this purpose are especially aminosilane esters, but also mercaptosilane esters and others with sufficiently reactive hydrogens. The sequence of the reactions is not critical, only care must be taken to assure that no unintended increase of molecular weight takes place. Thus, the following reaction sequences are alternatively possible:

(A)

Step 1: 1 mole of organofunctional silane + 1 mole of diisocyanate
Step 2: hydroxyl-containing polymer or polymer mixture + adduct from Step 1 in such an amount that the OH:NCO ratio is less than 1:0.9.

(B)

Step 1: hydroxyl-containing polymer+diisocyanate, a molar ratio of NCO:OH of close to 2:1 being selected to prevent undesired molecular weight build-up.

Step 2: reaction of this prepolymer from Step 1 with a stoichometric amount of an organofunctional silane ester named above.

Step 3: Mixing of product from step 2 with hydroxyl-containing polymer, so that the ratio of hydroxyl to alkoxysilyl groups is equal to or less than 0.9. The polymer used for this purpose can be either a starting product from Step 1 or another polymer of the above-named group which is tolerable therewith.

Diisocyanates which are suitable are fundamentally all known monomeric or polymeric diisocyanates which are available on the market, it being possible to eliminate Step 1 of procedure B by using a polymeric diisocyanate.

The use of triisocyanates is also basically possible. If they are used, care must be taken to see that no undesired molecular weight increase takes place.

Suitable organofunctional silanes are aminosilane esters of the general formula:

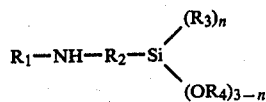

wherein:
$R_1$=H or alkyl, cycloalkyl, aryl, aralkyl or the moiety

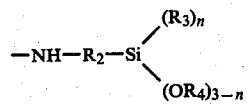

$R_2$=$C_1$-$C_5$ alkylene
$R_3$=methyl or ethyl
$R_4$=alkyl or alkoxyalkylene of up to 5 C atoms
n=0 or 1 or 2,
especially those having only one, preferably secondary, amino group. The following are given as examples:
gamma-aminopropyltrimethoxysilane,
gamma-aminopropyltriethoxysilane,
N-methyl-gamma-aminopropyltrimethoxysilane,
N-cyclohexyl-gamma-aminopropyltrimethoxysilane,
N-n-octyl-gamma-aminopropyltrimethoxysilane,
N-phenyl-gamma-aminopropyltrimethoxysilane,
Di-[1-propyl-3(trimethoxysilyl)] amine,
N-methyl-gamma-aminopropylmethyl dimethoxysilane.

Mercaptosilane esters of the formula

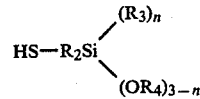

wherein $R_2$, $R_3$ and $R_4$ have the meaning given above, are also usable in the practice of the invention, examples being:
gamma-mercaptopropyltrimethoxysilane,
gamma-mercaptopropyltriethoxysilane.

In addition to methoxy and ethoxy silanes, other alkoxy substituents can be used, especially the monomethyl ethers of glycols such as ethylene glycol or diethylene glycol etc.

After the products have been applied they can be set in a variety of ways. For crosslinking by hydrolysis, it is especially advantageous that, in the case of coatings, a large surface is, of course, formed when a material is applied in a thin coat. Accordingly, the crosslinking will take place even at room temperature with atmospheric moisture. A substantial acceleration can be achieved by appropriate hydrolysis catalysts known from the literature, such as tin and titanium compounds or amines. A brief treatment with hot steam is especially effective.

Crosslinking by the application of heat begins at about 100° C. and proceeds rapidly at temperatures above 120° C. It is also accelerated by suitable catalysts, such as dibutyl tin dilaurate, for example, or other known transesterification catalysts. It also helps to remove from the equilibrium the low alcohols that are formed, unless this is accomplished automatically, as easily happens when thin coats are applied.

While it is not advantageous in the case of hydrolysis hardening, diols or polyols of low molecular weight can be used, in the case of thermal setting, as chain lengtheners.

As already stated above, the choice of the molar ratio of hydroxyl groups to alkoxysilyl groups covers a very wide range. In the case of hydrolysis hardening, however, excessive crosslinking should be prevented in order to avoid the disadvantages mentioned in the beginning. In practice, therefore, a molar ratio of hydroxyl to alkoxysilyl groups of 1.0 to 0.9 or less will be chosen, i.e., at least 5 mol-% and not more than 90 mol-% of the hydroxyl groups of the polymers will be replaced by alkoxysilyl groups. For the thermal setting it can be assumed that one trialkoxysilane can react with up to three hydroxyl groups, while a dialkoxy alkyl silane can react with only up to two hydroxyl groups. It will therefore not be difficult for the skilled art worker to establish the desired degree of crosslinking. In general, therefore, a molar ratio of hydroxyl to alkoxysilyl groups of 1:0.9 or less will also be selected for thermal setting.

The products of the invention can, of course, be provided with suitable inert diluents such as solvents, plasticizers, pigments and fillers, if they have a sufficiently low moisture content so as not to impair the shelf life of the preparations.

The products of the invention can be used in making adhesives, especially hot-melt adhesives and structural adhesives, as well as coatings such as cold- or hot-sealing coatings and varnishes, especially the so-called high-solid varnishes.

The practice of the invention will be described in detail in the examples that follow, and with reference to the drawings wherein:

FIG. 3 shows the change in consistency with time.

EXAMPLES

A. Components used

1. Polyesters

Figure 1:
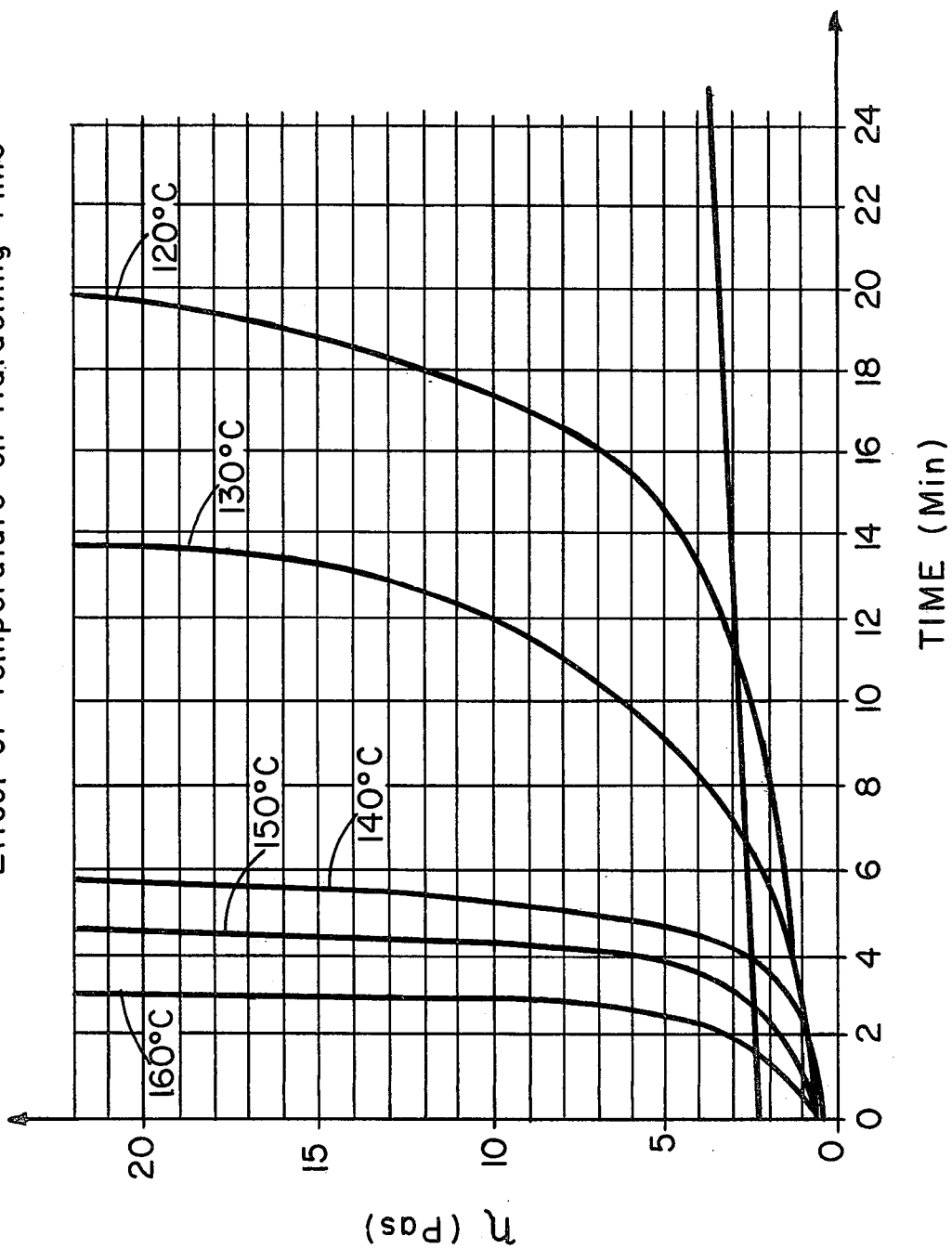
FIG. 1 shows the effect of temperature on hardening behavior.

The following polyesters were prepared from the dicarboxylic acids and glycols:

|  | PES 1 | PES 2 | PES 3 | PES 4 |
|---|---|---|---|---|
| Composition: (in mol-%) | | | | |
| Terephthalic acid | — | — | 35 | — |
| Isophthalic acid | — | — | 35 | — |
| Orthophthalic acid | — | — | — | 79 |
| Adipic acid | 100 | 100 | 30 | 21 |
| Ethylene glycol | 56 | 54 | — | 21 |
| Neopentyl glycol | 14 | 14 | 83 | 79 |
| Hexanediol-1,6 | 30 | 29 | — | — |
| Trimethylol-propane | — | 3 | 17 | — |
| Properties: | | | | |
| Glass transition temp. | −59° C. | −56° C. | +17° C. | +10° C. |
| Molecular wt. | 2000 | approx. 3000 | 2000 | 1700 |
| Hydroxyl No. | 55 | 35 | 95 | 60 |

2. Polyester mixtures

The following mixtures were prepared from the polyesters listed under 1:

|  | PES-M 1 | PES-M 2 | PES-M 3 |
|---|---|---|---|
| Composition: (in wt.-parts) | | | |
| PES 1 | 100 | — | — |
| PES 2 | — | 100 | 40 |
| PES 3 | 100 | — | 100 |
| PES 4 | — | 25 | — |
| Properties: | | | |
| Glass transition temp. | −38° C. | −49° C. | −16° C. |
| Hydroxyl No. | 76 | 43 | 77 |
| Viscosity, mPa.S | | | |
| 25° C. | 319,000 | 90,600 | 11,660,000 |
| 80° C. | 3,150 | 2,790 | 22,800 |

3. Polyethers

Of the great number of commercially available polyethers, a polyetherol sold by BASF under the trademark name "Luphen U 1220" was used. This product is a branched polypropylene glycol with a functionality of 3, hydroxyl number 32 to 36 and an average molecular weight of 4900.

4. Preparation of the hardeners

The term "hardener", as used hereinbelow, is to be understood to mean the component of the resin which contains the alkoxysilyl terminal group.

4.1 Adduct obtained from 3-isocyanatomethyl-3,5,5,-trimethylcyclohexylisocyanate (also called isophorone diisocyanate and abbreviated IPDI hereinbelow) and N-methyl-gamma-aminopropyltrimethoxysilane (Hardener 1).

In a 1000 ml three-necked flask with internal thermometer, stirrer and dropping funnel, 334 g of IPDI and 75 g of WITAMOL 600 (polymer plasticizer on a polyester base, mol. wt. 492, OH number 10 or less, mfd. by Dynamit Nobel AG) were placed. The content of the flask was cooled with an ice bath and the aminosilane was added drop by drop such that the temperature of the flask contents did not rise above 40° C.

After a total of 290 g had been added, stirring continued for another 10 minutes and then the NCO content was determined by titration pursuant to DIN 53,185.

Theory: 9.05% NCO. Found: 9.91 to 9.3%.

The product obtained is a colorless liquid with a viscosity of 3,730 mPa.sec. at 25° C., having good shelf life if moisture is excluded.

4.2 Adduct prepared from IPDI and N-methyl-gamma-aminopropylmethyl-dimethoxysilane (Hardener 2).

This product was prepared in a manner entirely similar to that described under 4.1 and it also is stable when stored with the exclusion of moisture.

Theory: 9.40% NCO. Found: 9.5%.

4.3 Adduct prepared from IPDI and N-cyclohexyl-gamma-aminopropyltrimethoxysilane (Hardener 3).

This adduct can also be prepared by the method described above and is stable when stored with the exclusion of moisture.

Theory: 8.7% NCO. Found: 8.7%.

4.4 Adduct prepared from IPDI and N-n-octyl-gamma-aminopropyltrimethoxysilane (Hardener 4).

This adduct can also be prepared by the method described in 4.1 and is stable when stored with the exclusion of moisture.

4.5 Adduct prepared from toluyl diisocyanate (TDI) and N-methyl-gamma-aminopropyltrimethoxysilane (Hardener 5).

This adduct was prepared only from the components listed above, without dilution by polymer plasticizers. Even with the exclusion of moisture it keeps for no more than a few days, and immediately after preparation it was reacted with one of the above-described polymer mixtures containing hydroxyl groups.

Theory: 11.44% NCO. Found: 11.5%.

4.6 Adduct prepared from methylene-bis-phenylisocyanate (MDI) and N-methyl-gamma-aminopropyltrimethoxysilane (Hardener 6).

This adduct was prepared as in 4.5 without plasticizer. It is not stable in storage and was reacted immediately as in 4.5.

Theory: 9.5% NCO. Found: 9.6%.

4.7 Adduct prepared from PES 1 and Hardener 1 (Hardener 7).

500 g (i.e., approx. 0.25 mol) of PES 1 and 0.2 ml of dibutyltin dilaurate (DBTL) were placed in a 1000-ml three-necked flask with internal thermometer, stirrer and dropping funnel in a dry nitrogen gas atmosphere and heated at 70° C. 285 g (approx. 0.6 mol) of Hardener 1 was added drop by drop, with stirring, and the progress of the reaction was followed by titration (NCO titration per DIN 53,185).

After about 3 hours the NCO content had dropped to 0.49% and no more free hydroxyl groups were available, and the reaction ended.

The product obtained in this manner is colorless and has good stability in storage with the exclusion of moisture.

Viscosity at 25° C. approx. 600,000 mPa.S.
Viscosity at 80° C. approx. 7,000 mPa.S.

4.8 Adduct prepared from PES 2 and Hardener 1 (Hardener 8).

By a procedure similar to that described in section 4.7, a hydroxyl-group-free adduct was prepared from 800 g of PES 2, 0.2 ml of DBTL and 250 g of Hardener 1. This product is still more viscous than Hardener 7 and has only a limited shelf life.

4.9 Adduct prepared from IPDI and N-methyl-gamma-aminopropyl-tris(methoxydiglycol) silane (Hardener 9).

The adduct was prepared from 33.3 g (0.15 mol) of IPDI in 5.0 g of WITAMOL 600 and 68.55 g (0.15 mol) of N-methyl-gamma-aminopropyl-tris(methoxydiglycol)-silane by a procedure similar to that described in 4.1.

Theoretical NCO content: 6.0%. Found: 6.3%.

4.10 Adduct prepared from IPDI and gamma-mercaptopropyl-silane (Hardener 10).

22.2 g (0.1 mol) of IPDI and 0.1 g of DBTL were placed in a 100 ml Erlenmeyer flask and heated at about 60° C. A total of 19.0 g (0.1 mol) of gamma-mercaptopropylisilane was added in small portions, while stirring with a magnetic stirrer, and the mixture was allowed to react for a total of 3 hours.

Theoretical NCO content: 10.1%. Found: 10.4%.

4.11 Adduct prepared from methylene-bis-phenylisocyanate (MDI) and gamma-mercaptopropylisilane (Hardener 11).

270 g of an MDI with an equivalent weight of 135 (instead of the theoretical value of 125 for pure MDI) was placed in a dry nitrogen atmosphere in a 1000 ml three-necked flask with internal thermometer, stirrer and dropping funnel, and heated at 70° C., and 190 g (1.0 mol) of gamma-mercaptopropylsilane was added drop by drop. After 2 hours the reaction had ended. The product is unstable in storage.

Theoretical NCO content: 7.9%. Found: 6.6%.

4.12 Adducts prepared from Luphen 1220 (polypropylene glycol; see section 3) and Hardener 1.

Two adducts were prepared as follows:

4.12.1 Molar ratio of Luphen 1220 to Hardener 1 (for purposes of comparison), 1:3, i.e., stoichiometrically complete.

120 g of Luphen (0.0245 mol)

34.3 g of Hardener 1 (0.0735 mol).

4.12.2 Molar ratio of Luphen 1220 to Hardener 1:1.2.

120 g of Luphen (0.245 mol)

22.8 g of Hardener 1 (0.049 mol).

These mixtures were reacted each in a dry nitrogen atmosphere at 70° C., with catalysis by 0.2 g of DBTL. After 2 hours of reaction, the reaction had completely ended so that no more free —NCO could be detected.

5. Examples of the hardening of the mixtures of the invention.

5.1 Effect of temperature on hardening.

The components described above were mixed at 80° C. and the viscosity increase was measured at different temperatures in a Rheotron rotation viscosimeter (plate-and-ball combination P 10):

Polyester mixture PES-M 1 100 weight-parts,
Hardener 1 5 weight-parts,
DBTL 0.3 weight-parts.

The results are represented in FIG. 1 and they show that at 100° C. this mixture shows a barely perceptible viscosity increase, and accordingly can still be worked easily at this temperature.

At temperatures above 130° C., the hardening takes place rapidly and at temperatures above 120° C. it still is completed in only a few minutes.

5.2 Effect of hardener concentration on viscosity at constant temperature.

Figure 2:
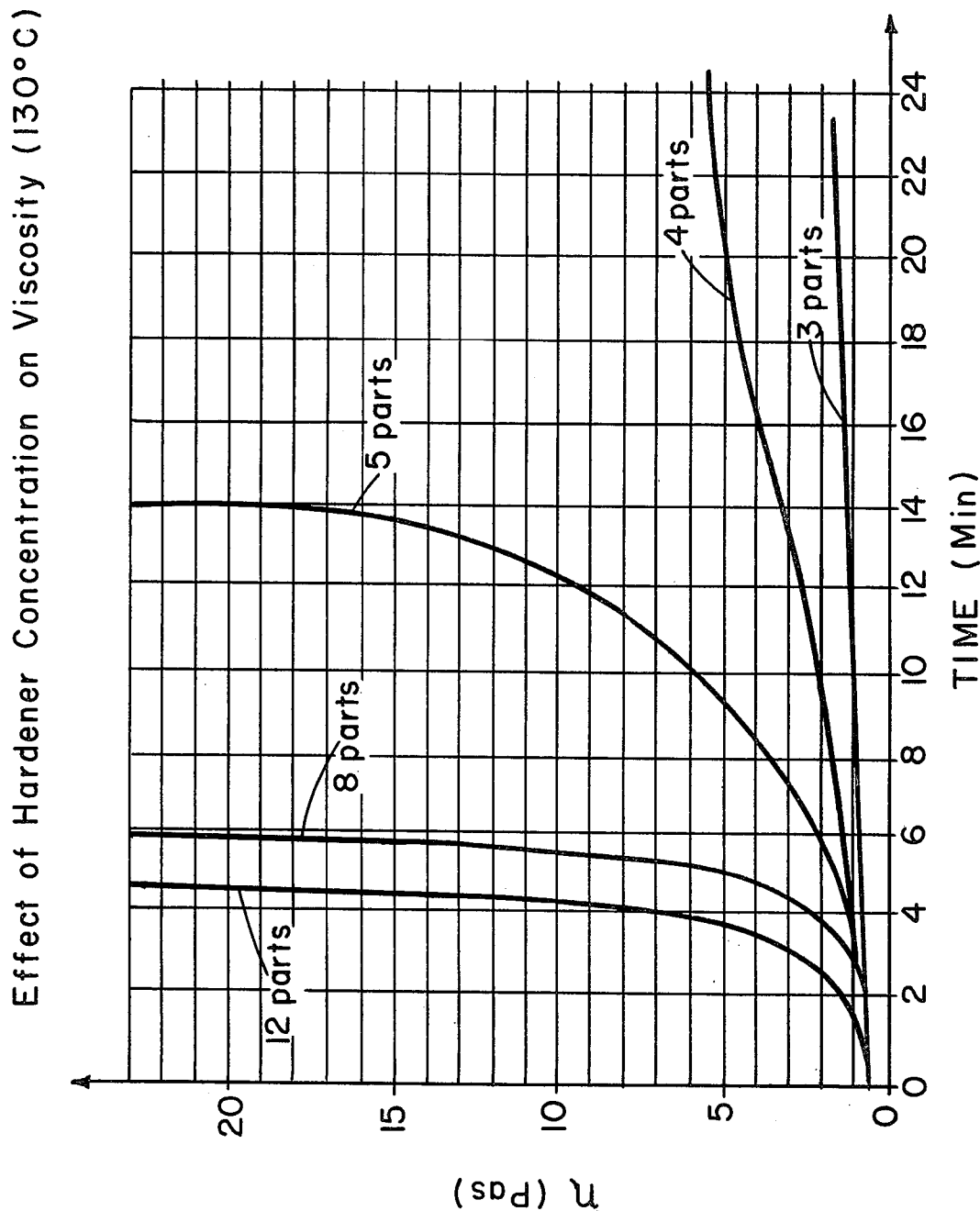
FIG. 2 shows the effect of hardener concentration on viscosity behavior.

In the same experimental arrangement as described in 5.1, the influence of the amount of hardener at 130° C. was tested, using 3, 4, 5, 8 and 12 parts of hardener 1 for 100 weight-parts of PES-M 1 and 1 part of DBTL. The results are represented in FIG. 2.

5.3 Hydrolytic setting

Two weight-parts of polyester mixture PES-M 1 and one weight-part of Hardener 7 were mixed at 80° C. in a Brabender Plastograph, and the stoichiometric amount of water needed for the complete hydrolysis of Hardener 7 was added. The increase in consistency with advancing hydrolysis is represented in FIG. 3.

It will be understood that the specification and examples are illustrative but not limitative of the present invention and that other embodiments within the spirit and scope of the invention will suggest themselves to those skilled in the art.

What is claimed is:

1. A crosslinkable resin mixture which is liquid at temperatures below 100° C., is made from polymers containing hydroxyl groups and having a molecular weight of 500 to 30,000, and wherein 5 to 90 mol.-% of the hydroxyl groups originally present in the mixture have been replaced by the reaction product of an organosilane of the general formula $$R_1-NH-R_2-Si\diagup^{(R_3)_n}_{\diagdown (OR_4)_{3-n}}$$

or $$HS-R_2-Si\diagup^{(R_3)_n}_{\diagdown (OR_4)_{3-n}}$$

wherein $R_1$=H or alkyl, cycloalkyl, aryl or aralkyl, $R_2=C_1-C_5$ alkylene, $R_3$=methyl or ethyl, $R_4$=alkyl or alkoxyalkylene of up to 4 carbon atoms, and n=0 or 1 or 2, with a monomeric or polymeric di- or triisocyanate.

2. The crosslinkable resin mixture of claim 1, wherein the polymers contained in the mixture contain terminal or randomly distributed hydroxyl groups as well as groupings of the general formula $$-OCO-NH-R_x-NH-CO-\underset{\underset{R_1}{|}}{N}-R_2-Si\diagup^{(R_3)_n}_{\diagdown (OR_4)_{3-n}}$$

or $$-OCO-NH-R_x-NH-CO-S-R_2-Si\diagup^{(R_3)_n}_{\diagdown (OR_4)_{3-n}}$$

wherein $R_x$=residue of the monomeric or polymeric diisocyanate that was used for the preparation.

3. The crosslinkable resin mixture of claim 1, characterized in that its setting is brought about by reaction with water or atmospheric humidity or by heating to temperatures of 100° C. or higher.

4. The crosslinkable resin mixture of claim 3 wherein the temperature to which it is heated is at least 120° C.

5. The crosslinkable resin mixture of claim 1 further comprising a catalyst for accelerating the setting time of the adhesive.

6. The crosslinkable resin mixture of claim 1 wherein the polymers have a molecular weight in the range of 1000 to 10,000.

7. The crosslinkable resin mixture of claim 1 wherein 10% to 80 mole-% of the hydroxy group have been replaced.

8. The crosslinkable resin mixture of claim 1 wherein the polymer is selected from the group consisting of polyester polyols, polyether polyols, polyether ester polyols, functional glycerides, partial glycerides, polybutadienes containing hydroxyl group, and poly(meth-)acrylic acid ester copolymers; and having a point (Tg) of less than 20° C.

9. The crosslinkable resin mixture of claim 8 wherein the polymer is castor oil or ricinic monodiglyceride.

10. The crosslinkable resin mixture of claim 1 wherein the organosilane is
gamma-aminopropyltrimethoxysilane,
gamma-aminopropyltriethoxysilane,
N-methyl-gamma-aminopropyltrimethoxysilane,
N-n-octyl-gamma-aminopropyltrimethoxysilane,
N-phenyl-gamma-aminopropyltrimethoxysilane,
N-methyl-gamma-aminopropylmethyldimethoxysilane,
gamma-mercaptopropyltrimethoxysilane, or
gamma-mercaptopropyltriethoxysilane.

11. The crosslinkable resin mixture of claim 2 wherein the component of the resin mixture which contains the terminal group is selected from the group consisting of
an adduct of 3-isocyanatomethyl-3,5,5-trimethyl-cyclohexyl-isocyanate, with N-methyl-gamma-aminopropyltris-methoxydiglycol-silane, gamma-mercaptopropylsilane, N-methyl-gamma-aminopropyltrimethoxysilane, N-methyl-gamma-aminopropylmethyldimethoxysilane, or N-n-octyl-gamma-aminopropyltrimethoxysilane;
an adduct of toluyl diisocyanate with N-methyl-gamma-aminopropyltrimethoxysilane; and
an adduct of methylene-bis-phenylisocyanate and N-methyl-gamma-aminopropyltrimethoxysilane.

12. A crosslinkable resin mixture which is liquid at temperatures below 100° C., from polymers containing hydroxyl groups and having a molecular weight of 500 to 30,000, and wherein 5 to 90 mol.-% of the hydroxyl groups originally present in the mixture have been replaced by the reaction product of di-[1-propyl-3(trimethoxysilyl)]-amine with a monomeric or polymeric di- or triisocyanate.

* * * * *

UNITED STATES PATENT AND TRADEMARK OFFICE
CERTIFICATE OF CORRECTION

PATENT NO. : 4,474,933
DATED : October 2, 1984
INVENTOR(S) : Hans Huber et al.

It is certified that error appears in the above-identified patent and that said Letters Patent is hereby corrected as shown below:

Col. 1, line 51,   "2,971,751" should be -- 3,971,751 --.

Col. 6, line 4,    "9.91" should be -- 9.1 --.

Col. 7, line 15,   "mercaptopropylisilane" should be --mercaptopropylsilane--.

Col. 7, line 21,   "mercaptopropylisilane" should be --mercaptopropylsilane--.

Claim 8, line 6,   after "a" insert -- glass transition --.

Signed and Sealed this

Thirteenth Day of August 1985

[SEAL]

Attest:

DONALD J. QUIGG

Attesting Officer     Acting Commissioner of Patents and Trademarks